United States Patent [19]
Aguilhon et al.

[11] Patent Number: 5,434,799
[45] Date of Patent: Jul. 18, 1995

[54] METHOD AND APPARATUS FOR RECOGNIZING DATA TRAVELING ON A DATA TRANSMISSION NETWORK USING A DICHOTOMIZING SEARCH PROCESS

[75] Inventors: Bernard Aguilhon, Villeneuve-Loubet; Jean-Francois Karcher; Jean-Hughes Potiron, both of Valbonne, all of France

[73] Assignee: Telemecanique S.A., Rueil Malmaison, France

[21] Appl. No.: 37,583

[22] Filed: Mar. 26, 1993

[30] Foreign Application Priority Data

Mar. 27, 1992 [FR] France .................. 92 03728

[51] Int. Cl.$^6$ ............................................. G06F 15/20
[52] U.S. Cl. ................................................. 364/514 R
[58] Field of Search ............. 364/514, DIG. 1, 280, 364/281.3, 281.7, 281.8, 284, 284.4; 395/200, 575; 340/825.52; 370/85.1, 85.2, 85.15, 92

[56] References Cited

U.S. PATENT DOCUMENTS

| | | | |
|---|---|---|---|
| 4,413,318 | 11/1983 | Herrington | 364/DIG. 1 |
| 4,718,005 | 1/1988 | Feigenbaum et al. | 364/DIG. 1 |
| 4,870,571 | 9/1989 | Frink . | |
| 4,930,159 | 5/1990 | Kravitz et al. | 364/DIG. 1 |
| 4,949,337 | 8/1990 | Aggers et al. | 370/85.4 |
| 5,077,694 | 12/1991 | Sansong et al. | 364/DIG. 1 |
| 5,133,053 | 7/1992 | Johnson et al. | 364/DIG. 1 |
| 5,167,035 | 11/1992 | Mann et al. | 370/85.1 |
| 5,304,992 | 4/1994 | Harashima | 340/825.52 |

FOREIGN PATENT DOCUMENTS

0076408A3 4/1983 European Pat. Off. .
0130802A3 1/1985 European Pat. Off. .

OTHER PUBLICATIONS

"Indexing Method for Fast Random Access to Collated Data", IBM Technical Disclosure Bulletin, vol. 29, No.4, Sep. 1986.

Primary Examiner—Ellis B. Ramirez
Attorney, Agent, or Firm—Oblon, Spivak, McClelland, Maier & Neustadt

[57] ABSTRACT

A method and apparatus for recognizing whether data on a network is intended for a terminal of the network. An identifier having a high-order portion and a low-order portion is received by a terminal. The terminal looks up, in a direct read table, whether the direct read table contains an entry corresponding to the high portion. The direct read table can contain, for each high portion, a size of a search table corresponding to low portions of the received identifier, a flag or bit, indicating that there a search table for a particular high portion, and an address of the search table. If the direct read table determines that there is a search table for the received high portion, a dichotomizing search process is executed to find an entry in the search table corresponding to the low portion. The dichotomizing search process divides the search table in half to determine if the received low portion of the identifier is in the lower or upper part of the search table. If it is in the lower portion, the search process divides the lower portion into two halves and searches these halves for the entry corresponding to the lower portion. This divide and search process continues until an entry in the search table is found which corresponds to the low portion, or a predefined maximum number of divide and search operations are performed.

14 Claims, 4 Drawing Sheets

| | D7 | | | | | | | D0 |
|---|---|---|---|---|---|---|---|---|
| | | | | DIRECT READ TABLE 51 | | | | |
| OCT.0 | N_ID_L7 | N_ID_L6 | N_ID_L5 | N_ID_L4 | N_ID_L3 | N_ID_L2 | N_ID_L1 | N_ID_L0 |
| OCT.1 | EMPTY BIT | | | | | | @ID_L3 | @ID_L2 |
| OCT.2 | @ID_L11 | @ID_L10 | @ID_L9 | @ID_L8 | @ID_L7 | @ID_L6 | @ID_L5 | @ID_L4 |
| OCT.3 | @ID_L19 | @ID_L18 | @ID_L17 | @ID_L16 | @ID_L15 | @ID_L14 | @ID_L13 | @ID_L12 |

(rows labeled ID_H_i, ID_H_j, ID_H_k)

METHOD AND APPARATUS FOR RECOGNIZING DATA TRAVELING ON A DATA TRANSMISSION NETWORK USING A DICHOTOMIZING SEARCH PROCESS

BACKGROUND OF THE INVENTION

1. Field of the Invention

This invention relates to a method and apparatus for recognizing data traveling on a data transmission network by receiving, in a station of the network, identifiers. The identifiers each have a bit field for indicating if the identifiers belong to the reference identifiers attached to the station.

2. Discussion of the Background

A data transmission network, particularly in an industrial environment (a so-called ground network, for example) includes, in reference to FIG. 1, stations that are interconnected, through communication interfaces, by a transmission line 1 called a bus. Each of the stations transmits and receives on the network, data items; each data item constituting a field, i.e., an indivisible unit of bits. An identifier, a bit field or byte corresponding to each data item transmitted, allows the identification of the data item.

The identifier which is associated with each data item transmitted on the bus allows each station to determine if a particular data item is intended for the station. If it is intended for the station, information in the data item is given to that station. To perform these functions, each of the stations comprises a memory containing all of the identifiers which are associated with it.

Techniques for recognizing the identifiers are already known. A first known technique includes, at each station, a memory that can hold all the possible identifiers. By way of indication, this memory will have $2^{16}$ entries for 16-bit identifiers. It associates, with each identifier relating to the station, the address of the corresponding service specification. This technique exhibits the advantage of speed of recognition since the identifier itself constitutes the memory address, but the technique is restricting in memory space.

A second known technique performs a dichotomizing search in a table of identifiers grouping the identifiers recognized by the station, ranked by ascending order. The dichotomizing search determines by successive comparisons, in which half, then in which fourth, then in which eighth, then in which sixteenth, etc. the identifier is located. For a capacity of $2^n$ identifiers, n dichotomizing search iterations must be performed. This technique exhibits the advantage of limiting the memory space but its identification time is too long to guarantee an acceptable performance (i.e., high speed performance).

SUMMARY OF THE INVENTION

Accordingly, an object of this invention is to provide a novel process and device for recognizing identifiers which minimize, in comparison with the known technique of the direct search, the memory space occupied and accelerating, in comparison with the technique of the dichotomizing search, the speed of identification. This technique, therefore, makes it possible to reduce the identification time, while limiting the memory size.

This and other objects of the invention are accomplished by a method and apparatus which uses a high-order byte of a received identifier. The high-order octet is looked up in a direct read table which contains the size and the address of a search table containing a low-order byte of the reference identifiers of the station. A dichotomizing search is then performed by comparing the reference bytes of the search table with the low-order byte of the identifier received.

According to a characteristic of the process, the direct read table, for each high-order byte, contains a byte corresponding to the size of the associated dichotomizing search table and a byte corresponding to the address of this table.

According to another characteristic of the process, each dichotomizing search table contains the low-order bytes attached to the station and corresponding service specifications.

The device according to the invention is characterized by the fact that it comprises:

a memory in which at least one direct read table is located that provides, for each high-order byte received, the address and the size of an optionally associated dichotomizing search table containing the reference low-order bytes of the station;

means for storing the low-order byte of the identifier received;

means for performing a dichotomizing search of the low-order byte received in said reference low-order bytes.

According to another characteristic, the device comprises:

means for storing a so-called low delimiter address value and a so-called high delimiter address value and means for calculating a mean of these values;

means for comparing the low-order byte of the search table that corresponds to the mean calculated address value and the low-order byte of the identifier received and for loading the mean value either in the means for storing a so-called high delimiter address value or in the means for storing a so-called low delimiter address value.

According to another characteristic, the device comprises means for storing the high-order byte of the identifier received, means for storing the base address of the direct read table and for adding these values and delivering an address corresponding to the sum, to the memory.

According to another characteristic, the device comprises means for storing the base address of the search table and for adding this base address to the mean value and delivering an address corresponding to the sum, to the memory.

According to a further characteristic, the device comprises means for storing the low-order byte read into the search table and corresponding to the mean address value of said table and means for comparing the low-order byte received and said low-order byte read.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
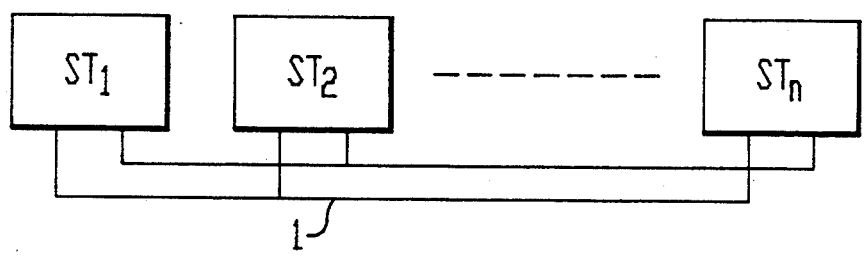
FIG. 1 is a diagram of a network used to transmit data between stations.

Referring now to the drawings, wherein like reference numerals designate identical or corresponding parts FIG. 1 thereof, several stations $ST_1$, $ST_2$... $ST_n$ have throughout the several views, and more particularly to been illustrated which exchange digital data between one another. For example, variables and/or messages are transmitted between the stations by a serial data bus 1 between the stations.

Figure 2:
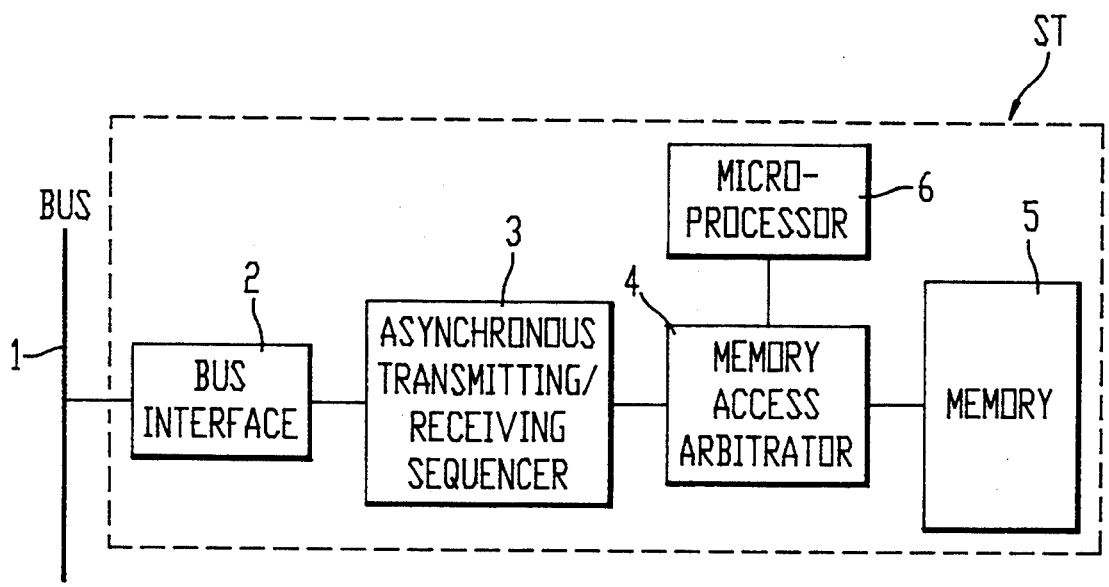
FIG. 2 is a functional diagram of the data recognition device constructed according to the invention.

Each station has, with reference to FIG. 2, a physical bus interface 2 which implements the physical layer of the bus and an asynchronous transmitting/receiving sequencer 3 (also referred to as transmitting/receiving unit 3) which recognizes any data item traveling on the bus. When the transmitting/receiving unit 3 recognizes an identifier, it transmits or receives the associated data. The station also has a memory 5 (e.g., RAM memory) and a microprocessor 6. A memory access arbitrator 4 manages the partitioning of memory 5, between the microprocessor 6 of the station and transmitting/receiving unit 3.

The field transmitted on serial bus 1 has an identifier which is composed of, for example, two bytes, one of which is the high-order byte and the other of which is the low-order byte. In the method and apparatus which are described here, the identifier is made up of 16 bits comprising two octets (eight-bit bytes). One is the high-order octet and the other is the low-order octet. However, the invention can be practiced using identifiers which have other sizes. In the following description, the identifiers received on the bus which are received by the station are distinguished from the reference identifiers which are the identifiers attached to the station and stored in the memory 5.

Figures 3, 4:
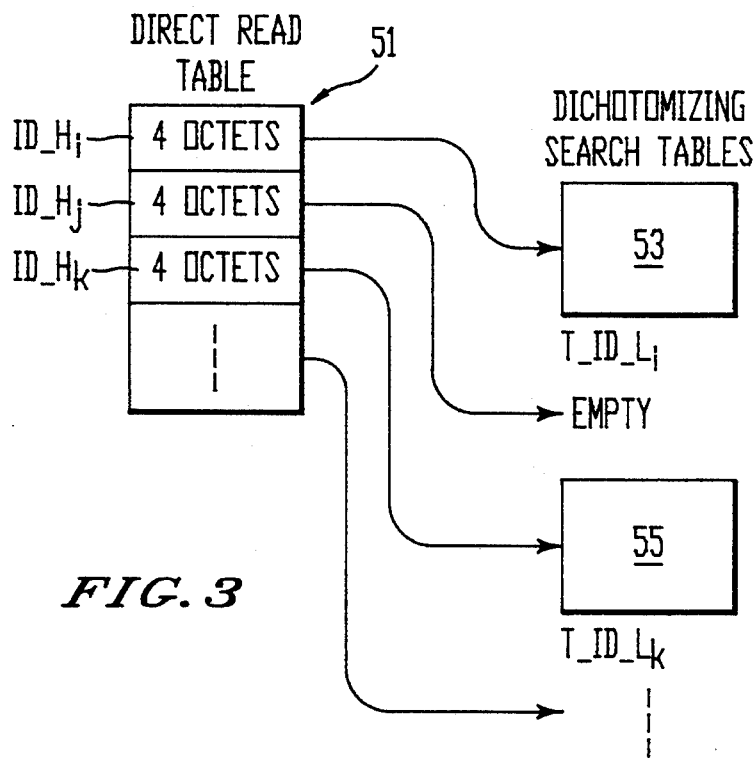
FIG. 3 is a diagram of the memory tables used by the invention.
FIG. 4 illustrates the contents of the direct read table of FIG. 3.

Turning now to FIG. 3, a direct read table 51 and associated dichotomizing search tables 53 and 55 are stored in the memory 5 of the stations. Table 51 is used in the direct reading of the high-order octets of the identifiers and the corresponding or associated tables 53 and 55 (also referenced $T\_ID\_L_n$) are used in the dichotomizing search of the low-order octets relating to the corresponding identifiers. The number of dichotomizing search tables is equal to the number of high-order octets assigned to the reference identifiers attached to the station.

The direct read table 51, illustrated in detail in FIG. 4, contains, for each high-order octet (labeled $ID\_H_n$), four octets for storing: the number of octets ($N\_ID\_Ln$, n=7-0) of the corresponding dichotomizing search table, a pointer or address (marked @ID-Ln, n=19-2) of the beginning of the corresponding dichotomizing search table, and a bit or flag (designated EMPTY) for indicating if there exists a dichotomizing search table for the high-order octet.

More specifically, for each high-order octet $ID\_H_n$ relating to the station, table 51 contains the address marked @ID_Ln of the corresponding dichotomizing search table ($T\_ID\_L_n$) of the low-order octets used by the station, these octets bytes being ranked by ascending order. Note that bits @ID_L1 and @ID_L0 are not contained in the table in the preferred embodiment but are considered to be zero. This is because the address stored therein will be a multiple of four and therefore, bits 1 and 0 will be zero.

Figure 5:
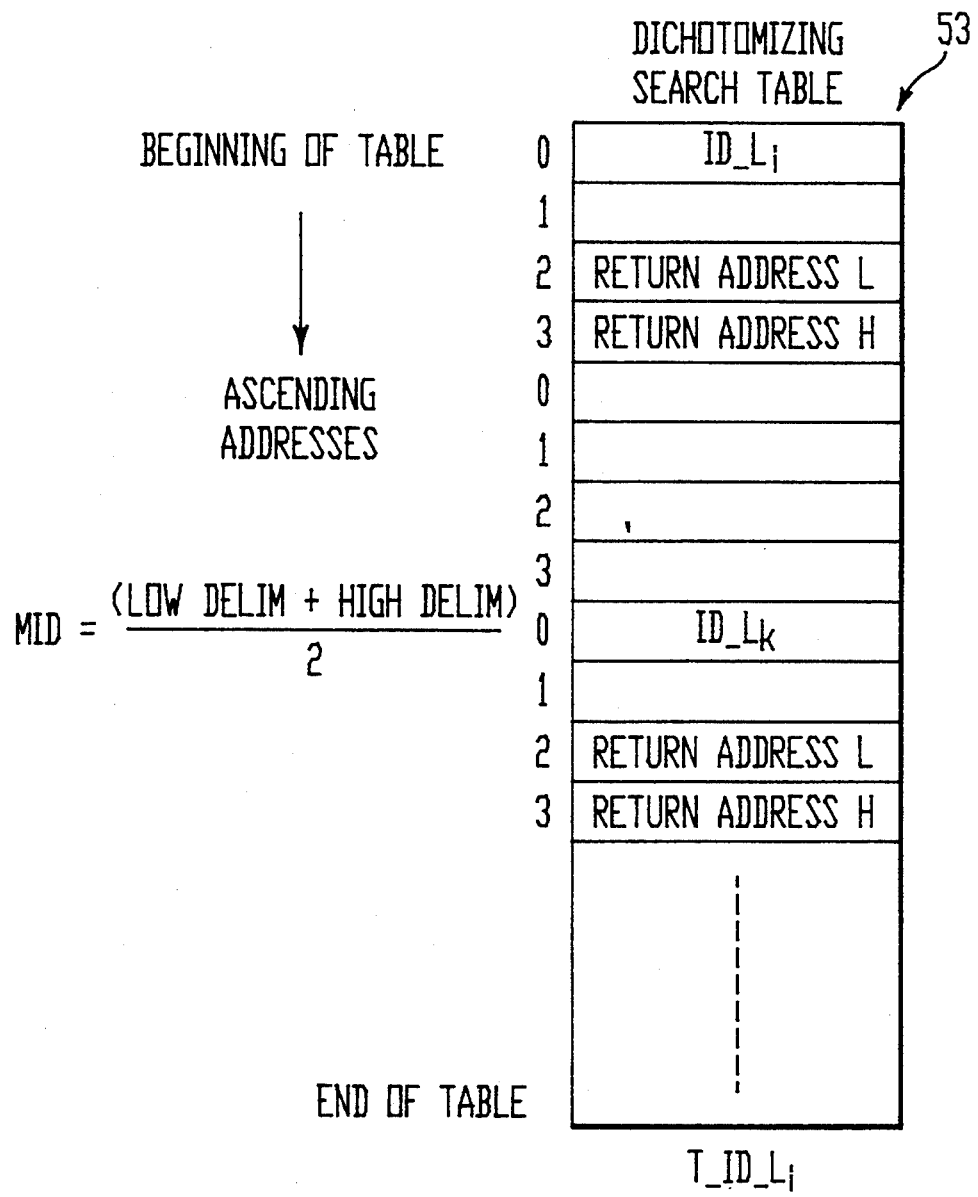
FIG. 5 illustrates the contents of one of the dichotomizing search tables of the low-order octets of the identifiers.

Turning now to FIG. 5, the dichotomizing search table 53 is illustrated. A dichotomizing search table such as this exists for each high-order octet stored in the direct read table 51. For each low-order octet ID_Ln of the dichotomizing search table, there are, four octets which include the low-order octet (ID_Ln) of the identifiers and the return addresses for describing the associated services (Return Address L and Return Address H). This information can be considered the service specification. It is also possible for other and different sized information to be stored as the service specification. Dichotomizing search table 55 and any other dichotomizing search tables used by the invention can have the same basic structure as the table illustrated in FIG. 5.

Figure 6:
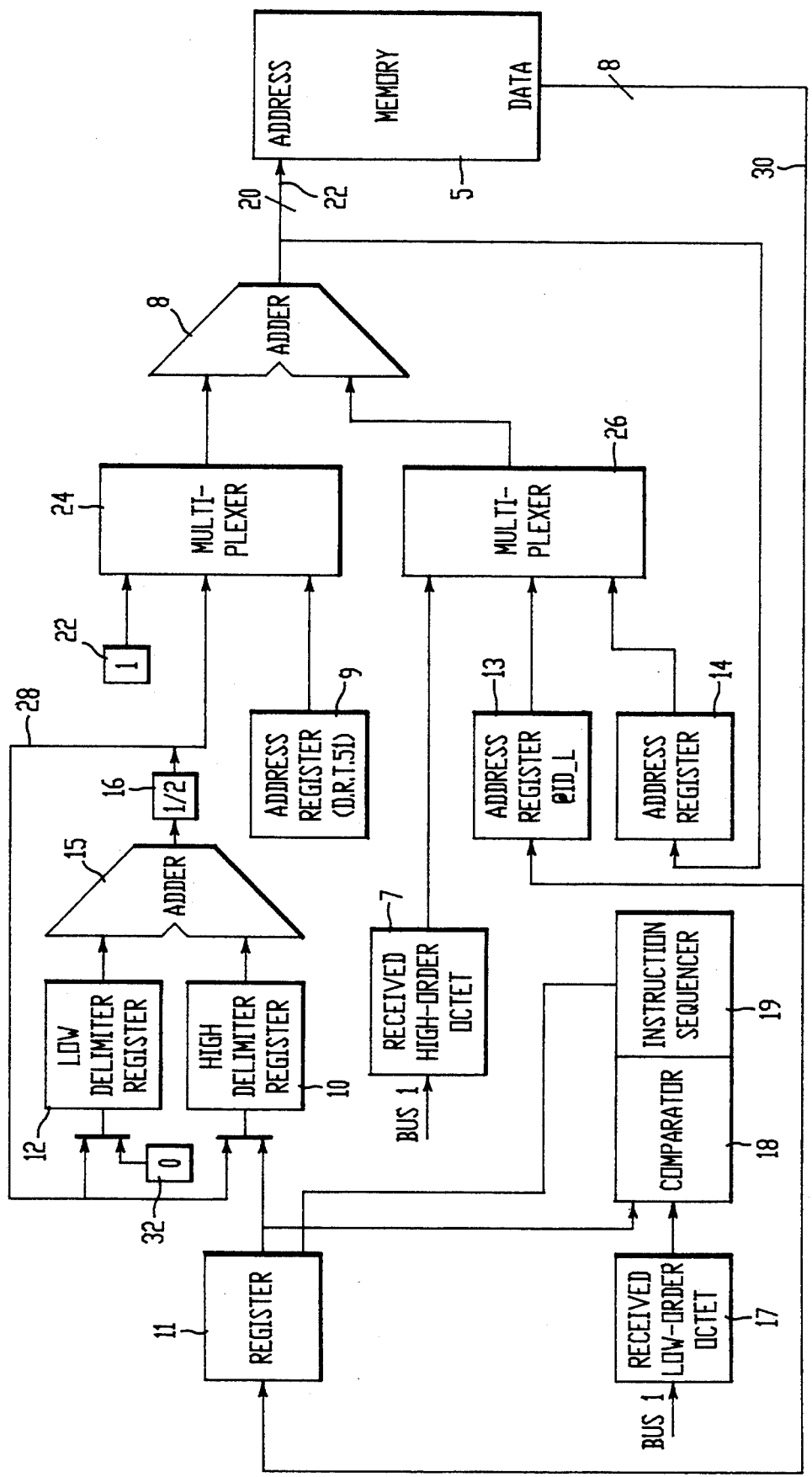
FIG. 6 is a detailed illustration of the device illustrated in FIG. 2.

FIG. 6 represents the transmitting/receiving unit 3 which performs the recognition process of the identifiers received from bus 1. The high-order octet and the low-order octet of an identifier received from bus 1 are stored respectively in internal registers 7 and 17. Register 7 is connected via a multiplexer 26 to an adder 8. This adder 8 is connected to the memory 5 via a 20 bit address bus 22.

Two 20 bit address registers 13 and 14 are connected to the adder 8 through the multiplexer 26. The address register 13 is loaded in three parts (lower, middle, upper) with the base address of the dichotomizing search table. An address register 14 receives an address which is on the bus 22.

An address register 9 is loaded by the microprocessor 6 with the base address of the direct read table 51. Its contents are transferred to the adder 8 through a multiplexer 24.

A register 11 has an input connected to data bus 30 and an output connected to a high delimiter register 10 working with a low delimiter register 12. The contents of the delimiter registers 12 and 10 are transferred to an adder 15 whose output, divided by two, via a divider 16 which can be a wired device, loops around on the inputs of the registers 12 and 10 via bus 28. The output of divider 16 is also connected, via a multiplexer 24, to the input of the adder 8. The high delimiter register 10 contains a "high" address of the dichotomizing search tables (search tables) while the low delimited register 12 contains a "low" address of the search tables, the qualifiers "low" or "high" referring to the ascending addresses of the search tables. At the beginning of the dichotomizing search process, the low delimiter register will be loaded with the value O which can be from a register 32, for example, which stores this value.

Comparator unit 18 compares the low-order octet of the identifier received and contained in register 17 with the octet ID_Ln read from the dichotomizing search table $T\_ID\_L_n$ and contained in register 11. Instruction sequencer 19 sequences the instructions from the various resources relative to the identifier search operations which have been described above and can be used to control all of the functional elements illustrated in FIG. 6.

The process performed by the present invention will now be described. However, before the actual dichotomizing search is performed, the registers of the invention are loaded with the appropriate values, as described below, so that the search can be performed.

When an identifier present on the bus 1 is received by a station, the high-order octet of this identifier is loaded into the register 7. The base address of the direct read table 51 which is contained in the register 9 and the high-order octet of the identifier received which is contained in the register 7 are added by the adder 8 to obtain the address of the high-order octet in the direct read table 51. A read access into the direct read table in the memory 5, through the adder 8, is performed at the address which is the sum of the registers 9 and 7. The high-order octet of the identifier is an address with immediate access in the direct read table. The address bus 22 connected to the memory 5 is a 20-bit bus. The two low-order bits are zero and the address where the reading into the memory 5 is performed is therefore a multiple of four. This is permissible as both the direct read table 51 and the dichotomizing search tables contain new entries every four octets.

The direct read table 51 comprises four consecutive octets for each high-order octet. The first octet of the direct read table (N_ID_L) is read at the address defined above (i.e. the result of the addition) and contains the size of the dichotomizing search table that corresponds to the high-order octet.

The read data of this first octet (the size of the corresponding search table) is written as a high delimiter in the register 10, via the register 11. At the same time, the address resulting from the addition mentioned above (the address of the last entry in the direct read table) is stored in register 14. This result in register 14 is added with a constant equal to 1 which can be stored in a register 22, for example. The result of this addition is a second address, corresponding to the second octet (octet 1), containing the "Empty" bit of the high-order octet of the direct read table 51. This second octet of the direct read table 51 is read from memory 5 via bus 30 and is loaded into register 11 to examine the "empty" state (generation of instruction) and into the lower part of register 13 for bits @ID_L3 and @IDL2 (i.e. address bits 3 and 2) of the corresponding dichotomizing search table.

The reading of the last 2 octets (octets 2 and 3) of the direct read table 51 is conditional on the state of the "Empty" bit (the second bit of octet 1 in FIG. 4). If the "Empty" bit is equal to 0, the reading of the third and fourth octets of the entry in the direct read table is performed to load them respectively in the middle and upper part of register 13. If the empty bit is equal to 1, the station does not recognize any identifier having this high-order, and the search is terminated.

Since the two low-order bits (@ID_L2 and @ID_1) of the address @ID_L19-@ID_L0 (of the corresponding search table) are equal to 0, this address is a multiple of 4.

The dichotomizing search process which follows is conditional on the loading, in register 17, of the low-order octet of the identifier received. At the beginning of the dichotomizing search, the low delimiter register 12 contains a value O which can be loaded from the register 32, while the high delimiter register 10 contains the number of low-order octets (N_ID_L) of the corresponding dichotomizing search table (i.e., the size of the search table).

During the first operation, the adder 15 and the divider 16 calculate the average (MID) of the value contained in the low delimiter register 12 and of the value contained in the high delimiter register 10. This average value MID is added, by adder 8, to the base address contained in register 13. The sum of this addition is sent to memory 5 by address bus 20 and the octet in memory 5 corresponding to this address is transmitted to register 11 via data bus 30.

Comparison is then made, in the comparator 18, of the reference value ID_Ln stored in register 11 with the value of the low-order octet corresponding to the identifier received on the bus and stored in register 17. If the low-order octet ID_Ln received and stored in register 17 is greater than the reference low-order octet ID_Ln (read at the address @ID_Ln) then low delimiter register 12 assumes the value MID defined above. If the low-order octet ID_Ln received and contained in register 17 is less than the reference low-order octet (read at the address @ID_Ln) then the high delimiter register 10 value MID. Following the comparison of the dichotomizing search, either high delimiter register 10 or low delimiter register 12 is loaded with the calculated value MID.

The calculation of the value MID, the comparison, and the loading of registers 10 or 12 are continued until the value of the reference low-order octet ID_L stored in table 53 is equal to the value of the low-order octet received and stored in register 17 or until the maximum number of iterations, linked to the size of the direct read table 53 have been reached. When the reference low-order octet stored in table 53 is equal to the value of the low-order octet stored in the register 17, the search stops because the identifier has been found in the table. An appropriate signal is activated and sent to a destination from the station. The instructions from unit 18 initiate the reloading of the low delimiter register 12 or of the high delimiter register 13.

It is possible to use more than one direct read table and use, for example, two direct read tables for recognizing the high-order octet of the identifiers if the tables are addressable at different addresses. This makes it possible to have a function for modification of the identifiers of a station during operation.

As a function of the constraints of speed and bulk to be observed, it is possible to use another partitioning of the identifiers between the two types of table 51 and 53. For example, a table 51 with 12 inputs for direct addressing on the first 12 bits and tables 53 limited to only the useful four-bit bytes for the final four bits, could be used. The access time would be shorter than in the solution described above, but the memory size would be greater.

It is also possible for the invention to be implemented by a microprocessor and software instead of the specific functional elements illustrated in FIG. 6.

If the present invention determines that a received identifier is intended for a station, that station can perform any known type of processing associated with the received identifier including receiving data associated with the identifier and any other type of processing such as alerting a user of the received information, searching a data base, using the received data within a program, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for processing data items on a data transmission network, comprising the steps:

receiving, in a station of the network, an identifier having a high portion and a low portion;

determining if the high portion of the received identifier corresponds to said station;

performing a dichotomizing search on a search table corresponding to said high portion by comparing the low portion of the received identifier with entries of said search table, if said high portion of the received identifier is determined to correspond to said station.

2. A method according to claim 1, further comprising the step of:

looking up an entry in a read table corresponding to the high portion of the received identifier, the entry in the read table including a size field corresponding to a size of said search table and address field containing an address corresponding to an address of said search table;

wherein the step of performing a dichotomizing search performs the dichotomizing search at said address of said search table contained in said address field and uses said size field to determine an end of said search table.

3. A method according to claim 1, wherein:

the step of performing the dichotomizing search performs the dichotomizing search using said search table by examining a field in the search table which contains low-order bytes which correspond to said station; and the method further comprising the step;

looking up a service specification in the search table for said high and low portions of said received identifier, if the dichotomizing search finds the low portion of the received identifier in said search table.

4. A method according to claim 1, wherein:

the determining step determines if the high portion of the received identifier corresponds to said station, by examining a flag of the read table to determine if said search table corresponding to the high portion exists.

5. A method for processing data traveling on a data transmission network, comprising the steps:

receiving, in a station of the network, an identifier having a high portion and a low portion;

determining if the high portion of the received identifier corresponds to said station by looking up, in a read table, if there is an entry in the read table which corresponds to the high portion;

determining an address of a search table which corresponds to said high portion, said search table having a beginning, a middle, and an end;

performing a dichotomizing search on said search table for said low portion of the received identifier when the determining step determines that said high portion corresponds to said station, by performing a dichotomizing search which performs the steps:

determining if the received low portion is less than, equal to, or greater than said middle of said search table;

terminating the dichotomizing search and indicating that said middle of said search table corresponds to said low portion, if said low portion is equal to said middle of said search table;

setting said end of said search table equal to said middle of said search table, calculating a new middle of said search table and performing the steps of the dichotomizing search, if said low portion is less than said middle of said search table; and setting said beginning of said search table equal to said middle of said search table, calculating a new middle of said search table and performing the steps of the dichotomizing search, if said low portion is greater than said middle of said search table.

6. An apparatus for processing data items on a data transmission network, comprising:

receiving means, connected to the network for receiving an identifier having a high portion and a low portion;

means, connected to the receiving means, for determining if said high portion of the received identifier corresponds to said station;

means for performing a dichotomizing search, connected to the determining means, on a search table corresponding to said high portion by comparing said low portion of the received identifier with entries of said search table, if said high portion of the received identifier is determined to correspond to said station.

7. An apparatus according to claim 6, further comprising:

look-up means, connected to the receiving means, for looking up an entry in a read table corresponding to said high portion of the received identifier, the entry in the read table including a size field corresponding to a size of said search table and an address field containing an address corresponding to an address of said search table;

wherein the means for performing a dichotomizing search performs the dichotomizing search at said address of said search table contained in said address field and uses said size field to determine an end of search table.

8. An apparatus according to claim 6, wherein:

the means for performing the dichotomizing search performs the dichotomizing search using said search table by examining a field in said search table which contains low-order bytes which correspond to said station; and the apparatus further comprises:

means for looking up a service specification, connected to the means for performing a dichotomizing search, in said search table for said high and low portions of said received identifier, if the dichotomizing search determines that said low portion of the received identifier corresponds to said station.

9. An apparatus according to claim 6, wherein:

the determining means determines if said high portion of the received identifier corresponds to said station by examining a flag of the read table to determine if said search table corresponding to the high portion exists.

10. An apparatus for processing data traveling on a data transmission network, comprising:

receiving means for receiving, in a station of the network, an identifier having a high portion and a low portion;

first determining means, connected to the receiving means, for determining if the high portion of the received identifier corresponds to said station by looking up, in a read table, if there is an entry in the read table which corresponds to said high portion;

second determining means, connected to the first determining means, for determining an address of a search table which corresponds to said high portion, said search table having a beginning, a middle, and an end;

dichotomizing searching means, connected to the second determining means, for performing a dichotomizing search on said search table for said low portion in the received identifier when the determining step determines that said high portion corresponds to said station, by performing a dichotomizing search which performs the steps:

determining if the received low portion is less than, equal to, or greater than said middle of said search table;

terminating the dichotomizing search and indicating that said middle of said search table corresponds to said low portion, if said low portion is equal to said middle of said search table;

setting said end of said search table equal to said middle of said search table, calculating a new middle of said search table and performing the steps of the dichotomizing search, if said low portion is less than said middle of said search table; and setting said beginning of said search table equal to said middle of said search table, calculating a new middle of said search table and performing the steps of the dichotomizing search, if said low portion is greater than said middle of said search table.

11. An apparatus for processing data traveling on a data transmission network, comprising:

receiving means for receiving, in a station of the network, an identifier having a high portion and a low portion;

a memory for storing a base address of a direct read table;

first determining means, connected to the receiving means and the memory, for determining if said high portion of the received identifier corresponds to said station by looking up, at an address of the direct read table corresponding to a sum of said high portion and said stored base address, if there is an entry in the direct read table which corresponds to said high portion;

second determining means, connected to the first determining means, for determining an address of a dichotomizing search table which corresponds to said high portion, said search table having a beginning, a middle, and an end;

dichotomizing searching means for performing a dichotomizing search on said dichotomizing search table for said low portion of the received identifier after the first determining means determines that said high portion corresponds to said station, by performing a dichotomizing search which performs the steps:

determining if the received low portion is less than, equal to, or greater than said middle of said search table;

terminating the dichotomizing search and indicating that said middle of said search table corresponds to said low portion, if said low portion is equal to said middle of said search table;

setting said end of said search table equal to said middle of said search table, calculating a new middle of said search table and performing the steps of the dichotomizing search, if said low portion is less than said middle of said search table; and setting said beginning of said search table equal to said middle of said search table, calculating a new middle of said search table and performing the steps of the dichotomizing search, if said low portion is greater than said middle of said search table.

12. An apparatus according to claim 11, further comprising:

a control means, connected to the first determining means, the second determining means, and the dichotomizing search means, for controlling the operation of the first determining means, the second determining means and the dichotomizing search means by sequencing controlling instruction.

13. A method for processing data items on a data transmission network, comprising the steps of:

receiving, in a station of the network, an identifier having a high portion and a low portion;

looking up an entry in a read table corresponding to the high portion of the received identifier, information pertaining to a search table;

performing a dichotomizing search on the search table, using said information pertaining to the search table, to determine an entry corresponding to the low portion of the received identifier.

14. An apparatus for processing data items on a data transmission network comprising:

means for receiving, in a station of the network, an identifier having a high portion and a low portion;

means for looking up, connected to the means for receiving, information pertaining to a search table corresponding to the high portion; and means for performing a dichotomizing search on the search table, using said information pertaining to the search table, to determine an entry corresponding to the low portion of the received identifier.

* * * * *